No. 756,958. PATENTED APR. 12, 1904.
J. HARRAES.
OPTICAL APPLIANCE.
APPLICATION FILED NOV. 23, 1903.
NO MODEL. 3 SHEETS—SHEET 1.

Witnesses:
Harry R. White
Ray White

Inventor:
Johann Harraes
By Howard M. Cox
Atty

No. 756,958. PATENTED APR. 12, 1904.
J. HARRAES.
OPTICAL APPLIANCE.
APPLICATION FILED NOV. 23, 1903.
NO MODEL. 3 SHEETS—SHEET 2.
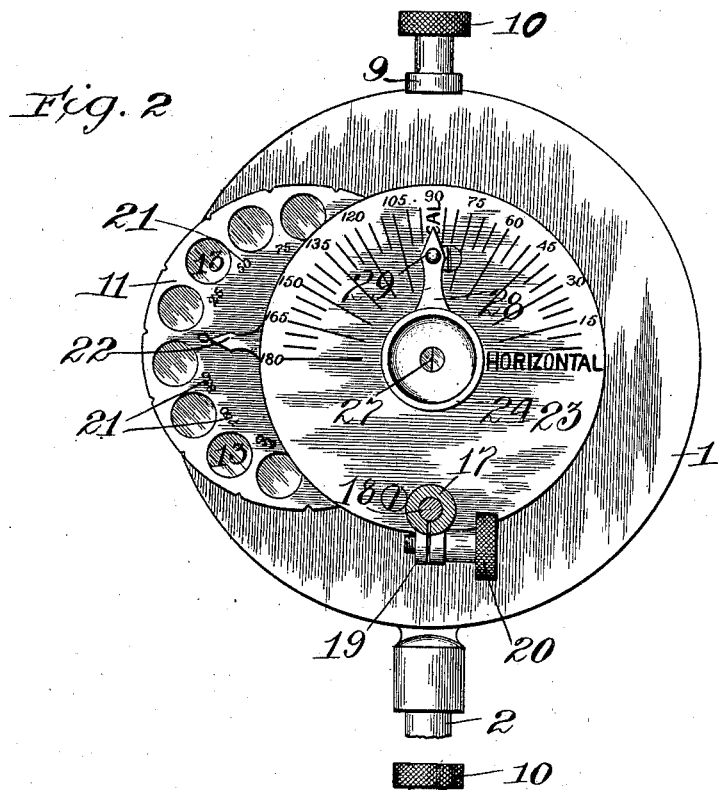
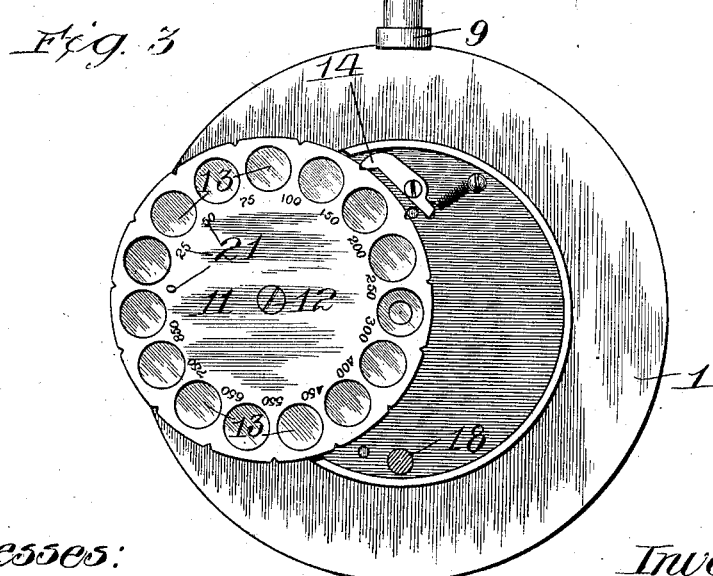
Witnesses:
Inventor:
Johann Harraes,
By Howard M. Cox
Atty.

No. 756,958. PATENTED APR. 12, 1904.
J. HARRAES.
OPTICAL APPLIANCE.
APPLICATION FILED NOV. 23, 1903.
NO MODEL. 3 SHEETS—SHEET 3.
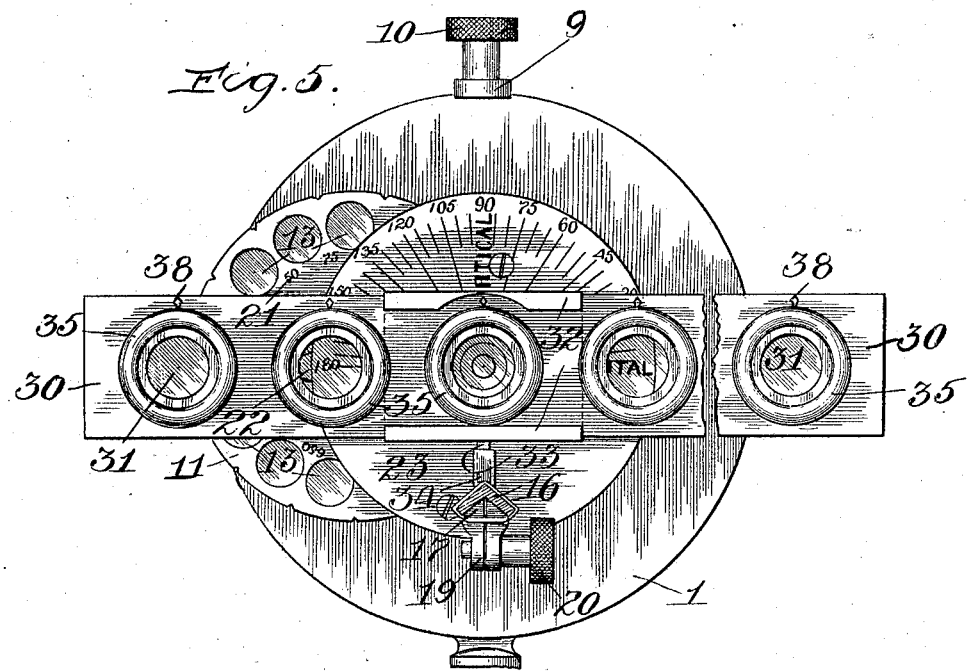
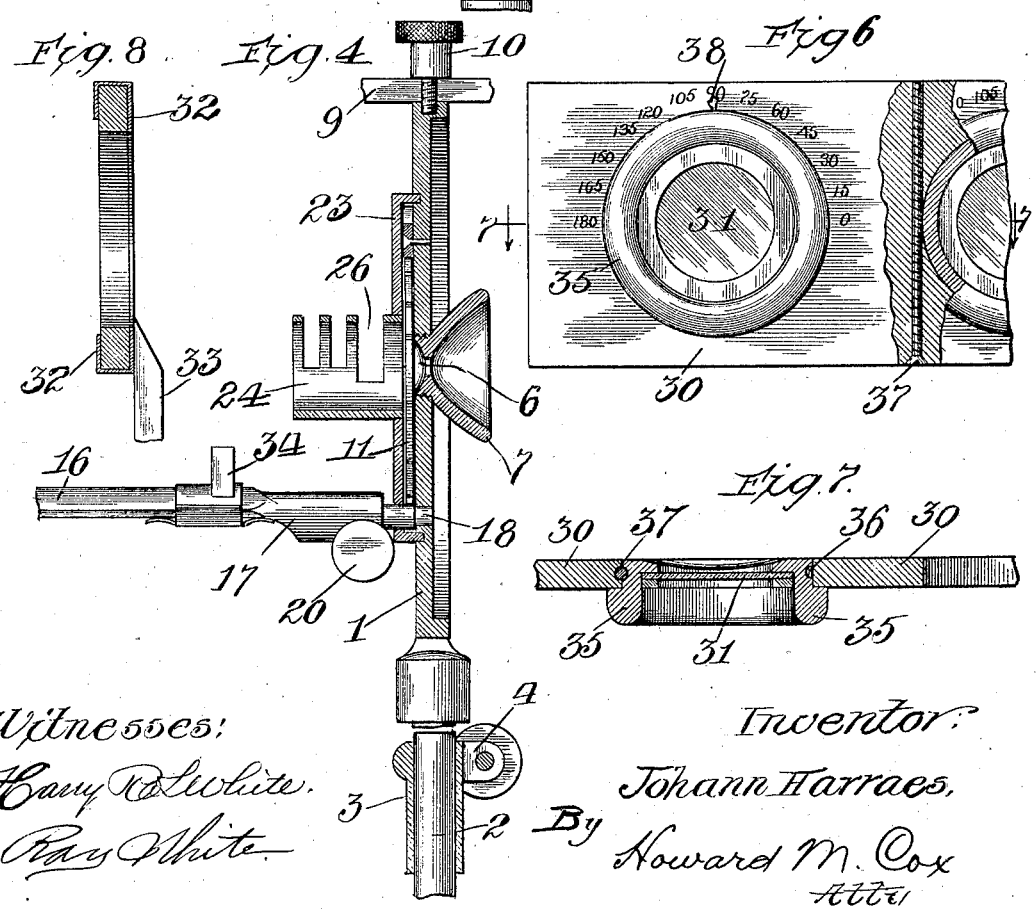
Witnesses: Inventor:
Johann Harraes,
By Howard M. Cox
Atty No. 756,958.

Patented April 12, 1904.

UNITED STATES PATENT OFFICE.

JOHANN HARRAES, OF CHICAGO, ILLINOIS.

OPTICAL APPLIANCE.

SPECIFICATION forming part of Letters Patent No. 756,958, dated April 12, 1904.

Application filed November 23, 1903. Serial No. 182,330. (No model.)

*To all whom it may concern:*

Be it known that I, JOHANN HARRAES, a citizen of the United States, residing in the city of Chicago, county of Cook, and State of Illinois, have invented a new and useful Improvement in Optical Appliances, of which the following is a specification.

My invention relates to optical appliances for testing human vision; and the general objects of the invention are, first, to provide a simple and durably-constructed appliance which may combine in itself the means for making a considerable number of tests each of which usually requires one or more instruments or appliances; second, to provide means whereby the making of the tests becomes greatly simplified, thereby minimizing the probability of error either from an improper adjustment of the appliance or mistake on the part of the operator in reading the indicia; third, to so combine the tests that one may assist in the making of another, thereby reducing the amount of time and effort required; fourth, to eliminate the necessity for numerical calculation upon the part of the operator, and, fifth, to provide means whereby the operator may make a series of tests rapidly, so that one test may follow another before the muscles of accommodation of the eye of the patient may change the condition of the eye. By this means one test serves as a check upon the other and the liability of an erroneous prescription is greatly lessened.

More specific objects of the invention are concerned with the different contrivances and details of construction, which will be described more fully hereinafter, and pointed out in the accompanying claims.

I attain these objects by the mechanism shown in the accompanying drawings, in which—

Figure 1:
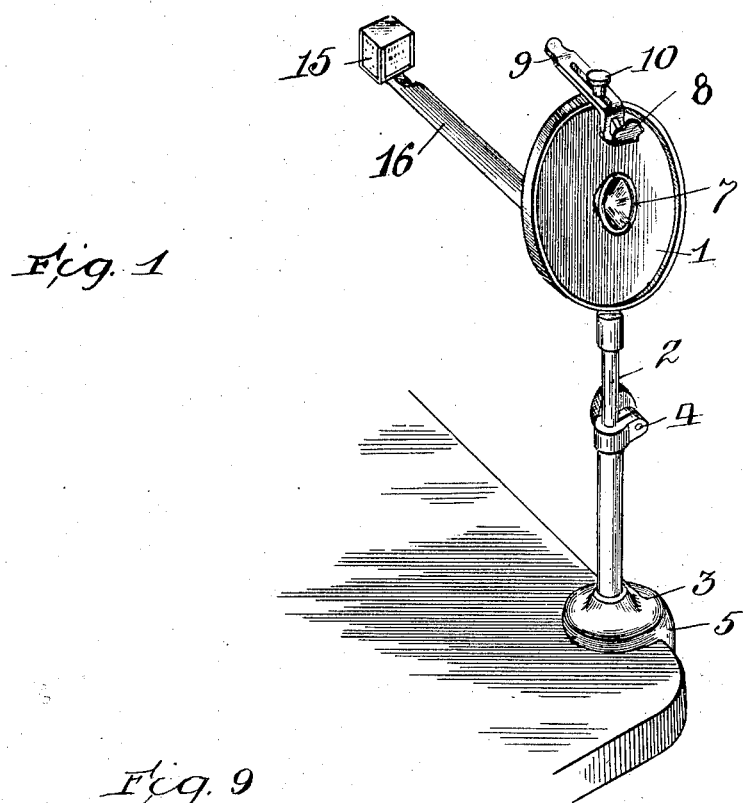
Figure 9:
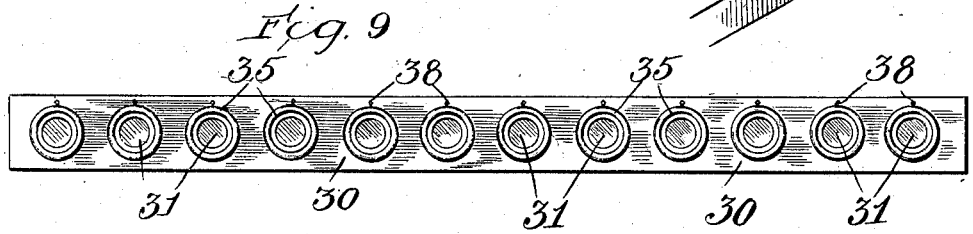
Figure 10:
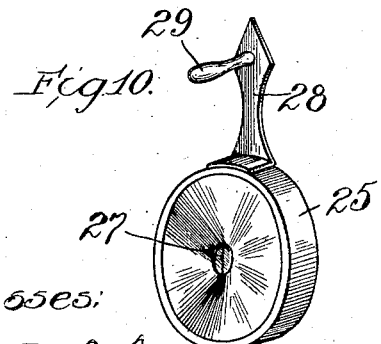
Figure 11:
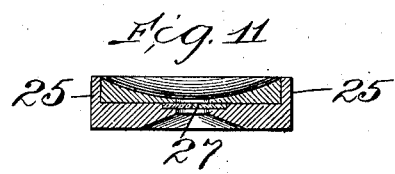

Figure 1 is a perspective view of the device, taken from a point in front thereof. Fig. 2 is a rear view of the main screen, showing the lens-disk, disk-plate, and axis-indicator in position thereon. Fig. 3 is similar to Fig. 2, except that the dial-plate and axis-indicator are removed to thereby better exhibit the method of mounting the lens-disk. Fig. 4 is a vertical central sectional view of the screen and adjacent parts. Fig. 5 is a rear view of the screen, showing the cylinder-bar mounted in position thereon. Fig. 6 is a detail view illustrating the method of mounting the cylinders in the cylinder-bar. Fig. 7 is a sectional view taken on the line 7 7, Fig. 6. Fig. 8 is a detail view, in vertical section, taken transversely to the cylinder-bar and showing the method of slidingly mounting said cylinder-bar in its holder. Fig. 9 is a face view of the cylinder-bar drawn to a decreased scale. Fig. 10 is a perspective view of the axis-indicator, and Fig. 11 is a transverse sectional view thereof.

Similar numerals denote similar parts throughout the several views.

The screen 1 is mounted on the rod 2 and is preferably circular in outline and constructed of metal. In order to provide for vertical adjustment and also a rotary movement about a vertical axis, said rod is telescopically mounted in the stand 3, said stand being provided with a clamp 4, whereby said rod may be rigidly held in any desired position. The clamp 5, formed at the bottom of said stand, enables the appliance to be fixed to a desk or table at the edge thereof in such position as to best accommodate both oculist and patient.

Preferably at the center of screen 1 is the aperture 6, at the front of which is fixed the eyepiece 7. The head-rest 8 is mounted upon the screen, above said eyepiece, and is adapted to make contact with the top of the forehead of the patient to thereby control the vertical as well as the horizontal location of the eye of the patient and maintain the eye steady in front of the aperture 6. The advantage of my head-rest over the chin-rests commonly employed is that the jaw of the patient is free to move to answer the questions of the practitioner without producing a movement of the head and eye of the patient. In order to accommodate the appliance to different patients, the shank 9 of the head-rest 8 is slotted to receive the set-screw 10, whereby said head-rest is adjustably secured to the screen 1.

The lens-disk 11 is pivotally secured to the back of the screen 1 by the pin 12 or other suitable means and is provided with a series of lenses 13 13 of different strengths. The lenses are arranged to form a circle near the periphery of disk 11, so that when the disk is rotated different ones of the lenses 13 will be brought opposite to the aperture in the eyepiece 7. In order that any particular lens 13 may remain stationary in the line of vision behind the eyepiece 7, a spring-actuated click or pawl 14 is pivoted to screen 1 in such position as to yieldingly engage the notched periphery of said disk 11, as best shown in Fig. 3.

It is common in making eye tests to employ a test card or chart at which the patient is required to look and by the aid of which the patient and practitioner may determine what prescription is necessary. When such card or chart is placed at a distance from the patient—as, for example, upon the opposite side of the room in which the test is being made—a room of considerable size is necessary. I avoid the necessity for a large room by reducing the size of the characters upon the chart in proper proportion and bringing such chart near to the eye of the patient. Suitable means for accomplishing this are shown in Figs. 1 and 4 and elsewhere in the drawings, wherein such charts are mounted upon a holder 15, which in the present instance is cubical in form. Said chart-holder is secured to the arm 16, said arm being secured to the socket 17, removably supported upon the stud 18 in said screen. In order that said socket 17 may be readily removed, I prefer to form a clamp 19 at the rear extremity thereof, said clamp being controlled by the screw 20. By tightening the screw 20 the clamp 19 may be caused to grip said stud 18 and hold said socket 17 and arm 16 in position.

The above-described parts are sufficient for making complete tests to determine the error of refraction in the eye of a patient, which error is usually referred to as deficiency of vision. The lenses 13 are all numbered as to their strength, and in order to decide as to the strength of lens necessary to correct the deficiency of vision it is merely necessary to rotate the lens-disk 11 and bring to a point opposite the eyepiece 7 such one of the lenses 13 as produces the greatest efficiency of vision. In order to readily determine the strength of the particular lens opposite to the eyepiece 7 at any given moment, a series of numbers 21 is arranged in a circle upon the lens-disk 11, so as to pass in front of the fixed pointer 22, formed on the fixed dial-plate 23. The parts are so arranged that the strength of the lens in line with the eyepiece will correspond to the number adjacent to said pointer 22.

The dial-plate 23 above mentioned is rigidly secured to the back of the screen 1 by means of screws or in any other suitable manner, and said dial is graduated upon its rear face to indicate the angle of inclination of the normal axis of the eye of the patient. The holder 24 is rigidly fixed to and extends rearwardly from the dial-plate 23 and serves to support the axis-indicator 25. In the preferred form said holder 24 is cylindrical and provided with a slot 26 for receiving the disk-like body of said axis-indicator. Said slot is of substantially the same width as the body of the axis-indicator, so as to prevent vibration or play in a fore-and-aft direction, and said slot extends to or below the center of the holder, so that the indicator may be removed by simply lifting it from the holder. The sides of the holder remaining below slot 26 serve to sustain the axis-indicator 25 and keep the center thereof coincident with the line of sight through eyepiece 7. The simplicity of construction and ease with which the axis-indicator may be placed *in situ* or removed constitutes one of the advantageous features of my appliance. The said axis-indicator contains a double prism 27 at its center, and the parts are so arranged that said indicator may be revolved within the holder 24 without removing said prism from a central position in front of the aperture in the eyepiece 7. The rotation of said axis-indicator varies the inclination of the normal axis of the prism 27, and the angle of inclination is measured by means of a pointer 28, which travels across the face of the dial-plate 23 when said axis-indicator is rotated in its holder 24. For convenience a handle 29 is provided on the pointer of said axis-indicator, whereby said indicator may be rotated.

When it is desired to make a test of the eye to determine the normal axis thereof, it is merely necessary with this appliance to rotate the pointer 28 to the left or right of the vertical position and read the dial-marking at which said pointer 28 is adjacent when the best vision of the patient has been determined. This is determined in practice by noting the apparent relative positions of a disk marked upon the test-chart employed.

For determining the axes or meridians of greatest and least efficiency in cases of astigmatism my appliance is also provided with a bar 30, containing a number (preferably twelve) of cylinders 31 of different convexities and concavities. Said bar is mounted so as to slide in a direction transverse to the line of vision through the eyepiece 7. A desirable manner of mounting said bar is afforded by the holder 32, which is adapted to support and guide said bar in its travel in front of said eyepiece. The socket 33 at the bottom of said holder is constructed to fit over the post 34 on the bar 16 for removably retaining said holder in position. The cylinders 31 are mounted in such a manner that each is independently revoluble in said bar 30. To accomplish this end, the said bar 30 is apertured to receive the circular cylinder-holders 35. Said holders have a circumferential groove 36 in their periphery adapted to receive the key 37 in the manner best shown in Figs. 6 and 7. Said key consists of a rod, screw, bolt, rivet, or similar device contained in bar 30 in position to pass through said groove 36, and thereby revolubly retain said holders 35 in position in said bar. For the purpose of rotating said holders 35 and also indicating at what angle a lens may be lying said holders are provided with pointers 38, and the different angles of inclination are marked in a circle upon bar 30 adjacent to the rim of the holders 35 in the manner shown in Fig. 6. In testing with the cylinders 31 the holder 32 is placed in position behind the screen 1 and the bar 30 inserted in said holder. The practitioner then ascertains by trial what angle of inclination of a cylinder gives the best results with the patient. When this angle is ascertained, the practitioner rotates every one of the cylinders 31 to such angle of inclination in bar 30. Subsequently the practitioner slides the bar 30 in the holder so as to bring different ones of the cylinders 31 into the line of sight through aperture 6 to thereby determine which of said cylinders produces the best vision in the patient. As it is merely necessary to slide the bar 30 in its holder 32 in order to bring a different cylinder into the line of sight, it is evident that the different cylinders may be brought into line very rapidly one after the other, and, moreover, inasmuch as each cylinder is independently revoluble in bar 30 the test may be made with the cylinders at any angle without changing the angle of inclination of said bar. By preference the cylinders in 31 are arranged in bar 30 in the order of their convexity or concavity, and usually the test for angularity will be made by means of the weakest one of said cylinders.

I do not wish to be understood as limiting myself to the precise construction or arrangement of parts here shown, for these may be considerably varied without departing from the spirit of my invention.

What I claim as new, and desire to secure by Letters Patent, is—

1. In an optical appliance, the combination with the supporting parts, of a slidable member, a set of cylinders; a set of holders for said cylinders revolubly mounted side by side in said slidable member, said holders being circular in form and having a circumferential groove in their peripheries; and a key in said slidable member for entering the groove in said holders for the purpose described.

2. In an optical appliance, the combination with the supporting parts, of a slidable member, a cylinder, a circular cylinder-holder revolubly mounted in said slidable member; a pointer on said holder and markings on said slidable member adjacent to the periphery of said holder for indicating the angles of inclination of said pointer.

3. In an optical appliance, the combination of a screen having a sight-aperture therein; a lens-disk behind said screen and a head-rest adjustably mounted upon said screen above the sight-aperture therein, said head-rest being adapted to make contact with the top of the forehead of the patient to thereby control the vertical as well as the horizontal location of the eye of the patient substantially in the manner and for the purpose described.

JOHANN HARRAES.

Witnesses:
  HOWARD M. COX,
  J. I. MCDONALD.